Figure 1:
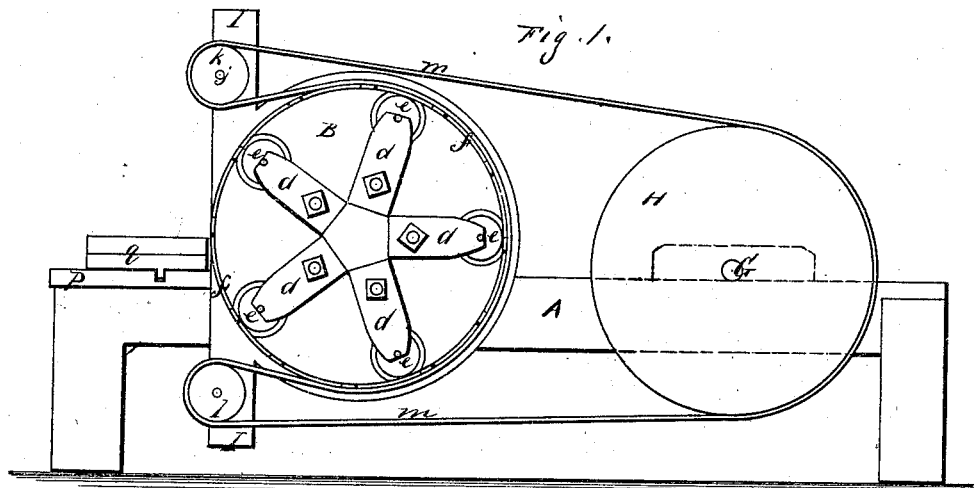
Figure 2:
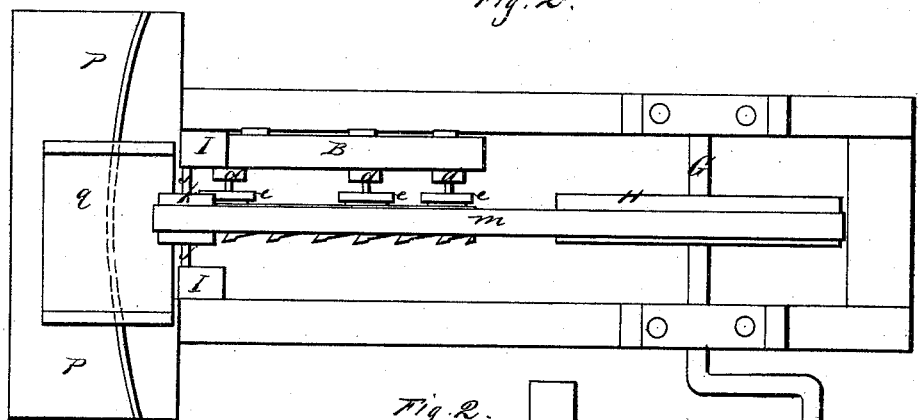
Figure 2:
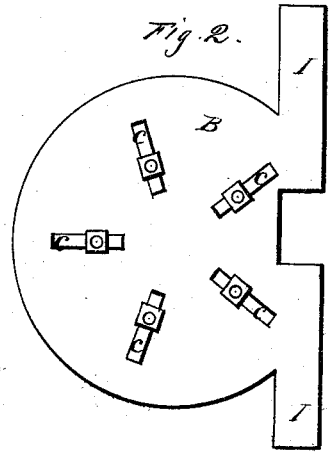

A. Rewrick,
Stave Machine.

No. 113,565.    Patented Apr. 11, 1871.

Witnesses.
J. L. Boone
Wm. H. Runnels

Inventor.
Assaria Rewrick
by Dewey & Co.
His Attorneys

N. PETERS, PHOTO-LITHOGRAPHER, WASHINGTON, D. C.

United States Patent Office.

ASSARIA REWRICK, OF SAN FRANCISCO, CALIFORNIA.

Letters Patent No. 113,565, dated April 11, 1871.

---

IMPROVEMENT IN MACHINES FOR SAWING STAVES.

---

The Schedule referred to in these Letters Patent and making part of the same.

---

*To all whom it may concern:*

Be it known that I, ASSARIA REWRICK, of the city and county of San Francisco, State of California, have invented an Improved Machine for Sawing Barrel-Staves; and I do hereby declare the following description and accompanying drawing are sufficient to enable any person skilled in the art or science to which it most nearly appertains to make and use my said invention or improvement without further invention or experiment.

My invention relates to improvements in mounting and operating saws which are intended to be used for sawing out circular work, such as is required in forming or shaping barrel-staves in the rough; and It consists in the employment of a cylindrical or band-saw, which is mounted upon a series of friction-rollers, which is arranged circularly and driven by an endless belt. They are adjustable to and from the center, so that any desired circle can be obtained by shifting them to the proper position.

In order to describe my invention more fully, reference is had to the accompanying drawing forming a part of this specification, in which—

A represents a strong frame.

B is a strong metal plate, of any desired shape, which is secured vertically to one of the timbers of the frame.

Through this plate, and on radial lines from its center, is made a number of slots, *c c*.

In these slots boxes *d* are secured so that they can be adjusted to or from the center, as desired.

In each of these boxes are placed friction-rollers *e*, so as to stand parallel with the vertical plate B.

These rollers will then be arranged in a circle around the inner face of the plate B, and a cylindrical or band-saw, *f*, is placed over them, so as to revolve upon the rollers, with its teeth outward, as shown.

A shaft, G, passes across the rear end of the frame and carries a pulley, H.

Vertical standards I extend upward on each side of the cylindrical saw, *f*, just in front of its center, and also extend below it under the frame.

A small shaft, *j*, bears in these standards, passing across nearly on a level with the top of the saw, and carries a pulley, *k*.

A similar shaft and pulley also pass across from one standard to the other, below the saw, and also carry a pulley, *l*.

An endless belt, *m*, passes around the lower pulley, *l*, and then is carried back half way around the saw *f*, until it comes to its top. It is then carried around the upper pulley *k*, and back around the large pulley H.

The revolution of the pulley H then causes the belt to revolve the saw upon the friction-rollers *e*, leaving one-half of the saw without anything to interfere with the block of wood being fed to it to be sawed.

A table, P, is arranged in front of the free half of the saw, and has a slide, *q*, upon it, which travels in a circular groove or channel in the upper surface of the table.

The block of wood to be sawed is placed on this slide, which carries it to the saw on a curved line, thus giving the proper longitudinal and transverse concave to the staves.

The friction-rollers can be adjusted back and forth in the slots, as desired, and thus run the saw in any desired shape, so as to give different degrees of concave at the sawing point.

Having thus described my invention,

What I claim, and desire to secure by Letters Patent, is—

1. The plate B, slotted as described, and having projections I I, forming supports for the pulleys *k l*, in combination with the adjustable boxes *d* and friction-rollers *e*, substantially as shown, and for the purpose described.

2. The pulleys *k l*, secured above and below and to one side of the center of the revolving saw *f*, and the large pulley H, in combination with the endless belt *m*, arranged to encircle the larger part of the saw, as described, for the purpose specified.

ASSARIA REWRICK.

Witnesses:
GEO. H. STRONG,
WM. H. RUNNELS.